United States Patent [19]

MacDonald

[11] Patent Number: 5,519,723
[45] Date of Patent: May 21, 1996

[54] OPTICAL PHASE CONJUGATION BY FOUR-WAVE MIXING IN A SEMICONDUCTOR INCLUDING DX CENTERS

[75] Inventor: Robert L. MacDonald, Princeton, N.J.

[73] Assignee: NEC Research Institute, Inc., Princeton, N.J.

[21] Appl. No.: 413,754

[22] Filed: Mar. 30, 1995

[51] Int. Cl.$^6$ .................................................... H01S 3/08
[52] U.S. Cl. ................................. 372/99; 372/9; 372/108; 372/21
[58] Field of Search .................................. 372/10, 108, 99, 372/97, 98, 92, 9, 21

[56] References Cited

U.S. PATENT DOCUMENTS

| | | | |
|---|---|---|---|
| 4,493,085 | 1/1985 | Valley | 372/99 |
| 4,709,368 | 11/1987 | Fukuda et al. | 372/99 |
| 5,309,473 | 5/1994 | Lee | 372/99 |
| 5,377,210 | 12/1994 | Hemmer et al. | 372/9 |

*Primary Examiner*—Leon Scott, Jr.
*Attorney, Agent, or Firm*—Arthur J. Torsiglieri

[57] ABSTRACT

A phase conjugate mirror is formed of a compound semiconductor doped with DX centers, such as silicon doped gallium-arsenide, through which are passed three light waves of the same wavelength but in different directions for non-linear four wave mixing. The phase conjugate mirror is used as one mirror of a confocal resonator housing a laser medium to form a laser and light from such laser is used to form the three waves of the same wavelength used to pump the phase conjugate mirror.

4 Claims, 3 Drawing Sheets ns. 723

OPTICAL PHASE CONJUGATION BY FOUR-WAVE MIXING IN A SEMICONDUCTOR INCLUDING DX CENTERS

FIELD OF THE INVENTION

This invention relates to a method and apparatus for achieving optical phase conjugation and to a method and apparatus for utilizing such achieved optical phase conjugation.

BACKGROUND OF THE INVENTION

Optical phase conjugation is a technique for reversing both the direction of propagation and the overall phase factor of an incoming wave. More precisely, optical wave conjugation has been described as a non-linear optical process for generating an output polarization that radiates a time-reversal optical field with a spatial phase profile proportional to the complex conjugate of an input optical field.

A thorough exposition of the principles of phase conjugate optics is found in a book entitled "Phase Conjugate Optics" authored by Jun-Ichi Sakai, published by McGraw-Hill, Inc., New York (1992), that is part of the Advanced Science and Technology Series. This book teaches a variety of techniques for achieving optical phase conjugation and of apparatus for utilizing this phenomenon and such teaching is incorporated herein by reference.

The principal use of optical phase conjugation is its use as a mirror to provide a reflected beam that retraces its original path independent of the angle of incidence on the conjugator providing the phase conjugation. The utility of the phase conjugation process largely stems from the fact that the useful properties of the conjugate beam ideally are not at all affected by the interposition of a distorting medium between the source of original beam and the reflector used to form the phase conjugate beam. This makes it possible through optical phase conjugation to double pass a high quality optical beam through a poor quality optical system ideally without loss of beam quality.

This ability of phase conjugation to correct phase aberration in a transmission path adapts a phase-conjugate mirror (PCM) for use as one reflector in an optical resonator for use with optical laser oscillators and in multiple pass optical laser amplifiers. In this application the PCM can compensate for any intracavity phase aberration. Introducing an aberration in the optical resonator does not change the nature of the output beam exiting at the conventional mirror of the resonator. The quality of the output beam from the resonator is entirely controlled by the quality of the conventional mirror.

Moreover, a unique characteristic of an optical resonator that includes a PCM, to be described hereinafter as a phase conjugate reflector PCR, is that it does not exhibit frequency drift and mode hopping as the distance between the conventional mirror and the PCM changes. This happens because the phase accumulated in travel in one direction between the two mirrors is cancelled in travel between the two mirrors in the opposite direction.

There is known a variety of ways for achieving optical phase conjugation. Of particular interest for the present invention is degenerate four wave-mixing. Here, two pump light waves of the same wavelength but from opposite directions are passed through an appropriate medium having a third-order optical non-linearity. Then when a third (probe) wave of the same wavelength is passed through the same medium but in a different direction, there is formed a phase conjugate wave (the fourth wave) of same frequency but opposite in direction to the third wave.

A problem that has limited the usefulness of an arrangement of this kind for generating optical phase conjugation is the inefficiency of the process with the result that only a small fraction of the energies of the three input waves becomes available as the energy of the fourth newly-generated beam, the useful optical phase conjugate. The process would be considerably more useful if there were available structures more efficient for generating the optical phase conjugate beam.

SUMMARY OF THE INVENTION

The invention is an improved process for generating a phase conjugate optical beam by four wave-mixing in a third order non-linear optical medium by using as the medium semiconductive materials that are doped with DX centers. Such materials are now known to experience optically induced refractive index changes as a result of photoionization of the DX centers. We have discovered that the use of such materials permits improved phase conjugation, especially useful since it can be achieved at near infrared to infrared wavelengths that are of particular practical interest because of the ready availability of semiconductive laser sources at such wavelengths. Such availability should make possible in a single semiconductive wafer monolithic integration of the PCMs with semiconductor laser amplifiers and laser oscillators that are efficient, stable and continuously tunable over a broad band of wavelengths.

A recognized problem in the use of some n-type doped crystalline compound semiconductive materials is that they exhibit so-called deep donor DX states or centers. The observed effects, which include severe carrier freezeout even at room temperature, have been explained in terms of a large lattice relaxation model and charge capture by the donor. In particular, it is known that in materials that exhibit this phenomena, the total energy of the donor atoms that have captured an electron and become negatively charged is lowered. In these materials, the DX state becomes the ground state of the system and a reduction of free carrier concentration by orders of magnitude from the impurity doping level is often observed at sufficiently low temperatures. As a result even heavily doped material may be rendered essentially insulating. Moreover, it has been shown that, in such materials, persistent photoconductivity (PPC) can occur when the DX states are ionized by photons of appropriate energy. As used herein, PPC means persistence for a time long enough after the illumination has been removed to be useful in the intended device application. For some device applications, persistence of a few seconds may be sufficient, for others persistence for hours may be needed. Generally, the duration of the persistence is a function of the temperature at which the material exhibiting the PPC is maintained, the colder the temperature the longer the persistence, as will be discussed more fully below. Upon photoexcitation each DX center is converted into a positively charged impurity ion, releasing two electrons into the conduction band. A barrier to recombination is formed by the structural relaxation required to return to the deep DX state. If the ambient temperature is sufficiently low, thermal excitation over the capture barrier occurs at a very slow rate and the free carrier concentration can remain high for long times resulting in PPC. The concentration of DX centers is nearly the same as that of the donor impurities and concentrations of $5 \times 10^{18}$ per cm$^3$ or higher can be achieved. In the original formulation of this model, it was proposed that a donor atom (D) forms a complex with an unknown lattice defect (X). It has subsequently been shown that the donor atom alone, through a distortion in the crystalline lattice associated with electron capture, is responsible for all of the observed phenomena. Nevertheless the "DX" terminology persists among workers in this field.

Examples of doped semiconductors that include DX centers are silicon-doped aluminum gallium arsenide, AlGaAs:Si, indium doped cadmium zinc telluride, CdZnTe:In, and tellurium doped aluminum gallium arsenide, AlGaAs:Te. Additionally, various other Group III–Group V semiconductors doped either with Group IV or Group VI elements and various Group II–Group VI semiconductors doped with Group III or Group VII elements are expected to exhibit the desired effect to varying degrees at appropriate temperatures. It is also expected that ionic crystals such as $CdF_2$ and $CaF_2$ doped with Group III elements such as indium, gallium and alumimum may prove useful. It is anticipated that this phenomenon is characteristic of many compound semiconductors, when appropriately doped, although the phenomenon is more useful in some than in others.

A typical arrangement for four wave-mixing to achieve phase conjugation would include a crystal of a doped semiconductor exhibiting DX centers of the kind described, a laser providing a laser beam, and optics for dividing the optical beam into three separate beams of the same wavelength of which the first and second pass through the crystal along the same path but in opposite directions while the third passes through along a path in a different direction, the three beams coinciding and interacting in a significant volume of the crystal whereby there is generated a fourth beam that is the phase conjugate of the third beam, exiting from the crystal along the path of the third beam but opposite in direction.

DETAILED DESCRIPTION OF THE INVENTION

Before proceeding to a description of specific embodiments of the invention, it will be helpful first to discuss some of the properties of DX materials that make them different from the materials previously used as the non-linear media in phase conjugate devices.

First the non-linear optical response of DX-centers is strictly a local response that requires no charge transport or charge separation. Accordingly, it is more efficient in converting absorbed photons to refractive index charges and also involves no phase shift between the encoded index patterns and illuminating patterns.

Also, the non-linearity is the result of free carrier nonlinearity and the changes in polarizability due to the free carrier creation takes advantage of the large polarizability of free carriers due to their large dipole moments and low effective mass.

Because of the metastability of free carriers the sensitivity and response time of the material can be adjusted within many orders of magnitude to best suit a particular application. Moreover, since the non-linear response varies approximately linearly with the doping density, a desired degree of non-linear response can be realized by appropriate fabrication. Also, DX materials can provide a strong non-linear response over a broad range of wavelengths since the DX materials used for phase conjugation are also materials that can be used for the fabrication of diode lasers, monolithic integration of a phase conjugate mirror and a diode laser becomes possible.

Figure 1:
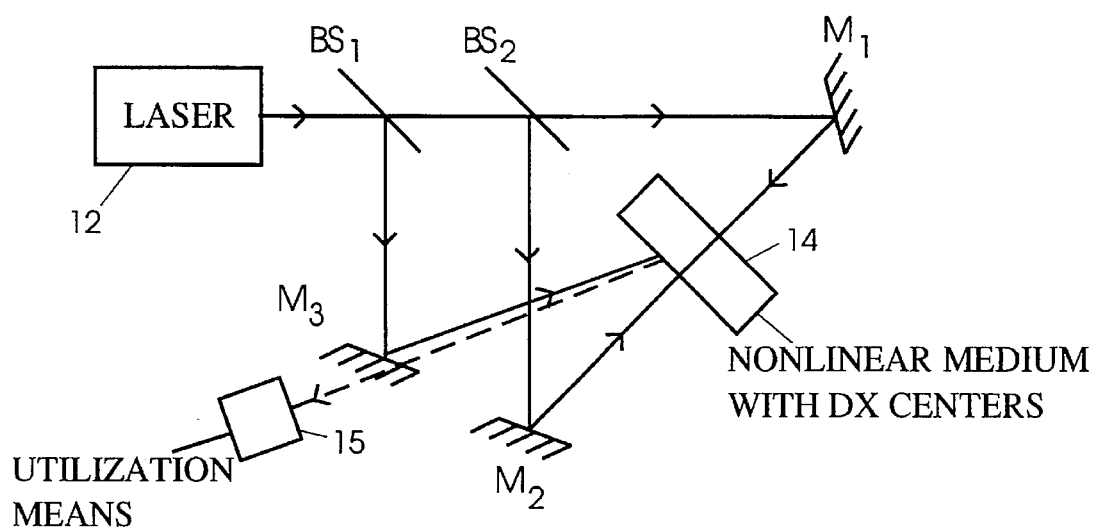
FIG. 1 shows the basic structure for four-wave mixing for optical phase conjugation in accordance with the invention.

With reference now to the drawing, FIG. 1 shows an arrangement 10 for achieving optical phase conjugation by using four-wave mixing in a doped semiconductor crystal that includes DX centers giving rise to a large third-order optical nonlinearity. It includes a laser 12 that serves as the source of the optical wave energy and a nonlinear medium 14 in which the four-wave mixing is to occur. In accordance with the distinguishing feature of the invention, the medium 14 is a wafer of a compound semiconductor appropriately doped, such as aluminum gallim arsenide doped with tellurium, to give rise therein to DX centers that create large third-order non-linear effects. To realize the three input waves needed for pumping the medium 14, the light beam emitted by the laser 12 is directed in turn through beam splitters $BS_1$ and $BS_2$. The portion of the light beam that passes through both beam splitters is deflected by mirror $M_1$ into a path that takes it through the non-linear medium. The portion of the light beam that passes through beam splitter $BS_1$, but deflected by beam splitter $BS_2$ is deflected by mirror $M_2$ into a path through the non-linear medium that substantially coincides with but is in a direction opposite to the portion that was deflected therethrough by mirror $M_1$. The portion of the light beam that was deflected by beam splitter $BS_1$ is deflected by the mirror $M_3$ into a path through the non-linear medium along a path that is transverse to the path of the other portions of the light beam through the medium. The interaction of the three light beams in the non-linear medium is the creation of the phase conjugate of the third portion of the light beam, a light beam that essentially retraces that of the light beam that was deflected into the nonlinear medium by way of mirror $M_3$. If the mirror $M_3$ is partially transmissive, part of the phase conjugate will pass therethrough to be available for utilization at the utilization means 15.

Figure 2:
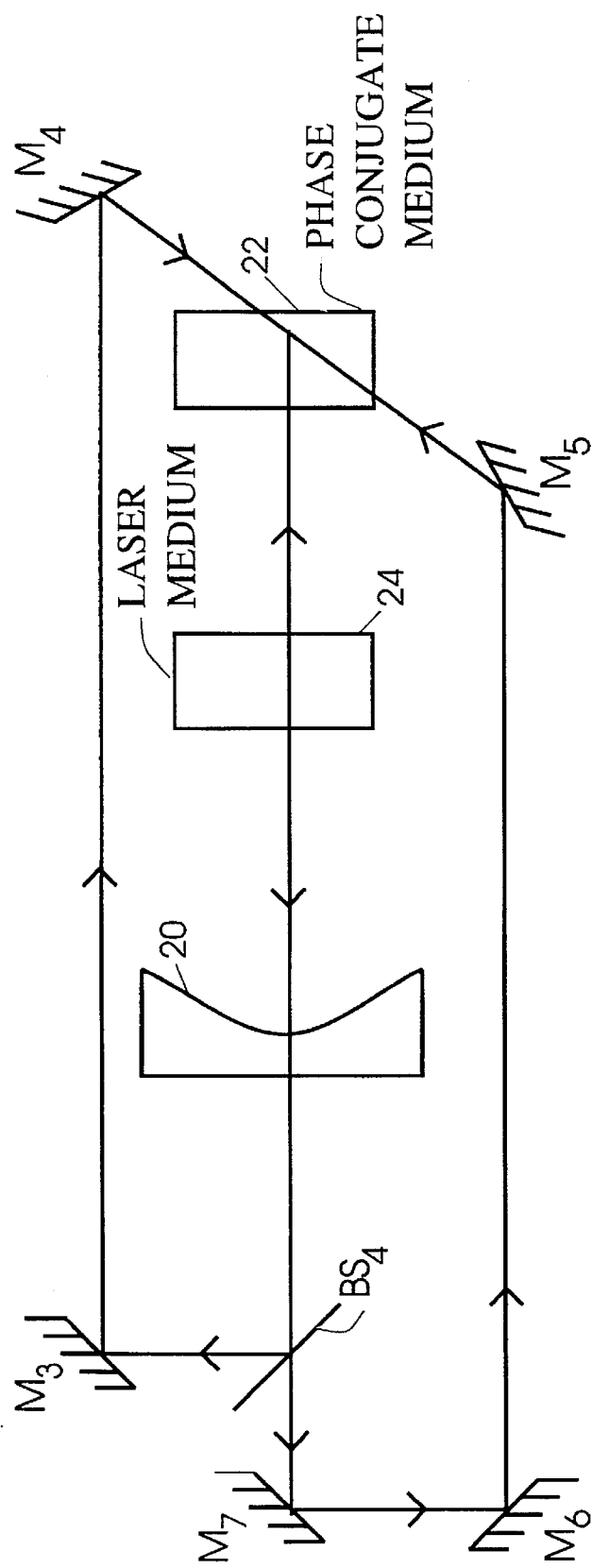
FIG. 2 shows a laser oscillator that uses a phase conjugate mirror as one reflector of its optical cavity in accordance with the invention.

Various applications have been proposed for the use of phase conjugate light. The presently preferred application for optical phase conjugation is to provide one of the end reflections in an optical cavity that houses an active laser medium, particularly at wavelengths in the infrared and near infrared portion of the optical spectrum. In FIG. 2, there is shown an arrangement for such an application.

Specifically, an optical resonator is formed by a conventional partially transmissive output mirror 20 and a phase conjugate medium 22 of the kind described consisting of a crystal of a semiconductor that is characterized by DX centers. The reflecting surface of the conventional mirror 20 advantageously is spherical to form with the phase conjugate medium a confocal cavity of the kind especially useful for housing an active laser medium. To this end, the phase conjugate mirror should include a reflecting surface to form the other surface of the confocal resonator. Housed within the resonator is a suitable laser medium 24 such as a gallium-aluminum arsenide wafer of the kind useful to produce laser light in the infrared. Appropriate means (not shown) are included for pumping the active medium into an oscillatory state. A portion of the light beam exiting the partially transmissive output mirror 20 is collected to provide two of the pump waves needed for operation by the phase conjugate mirror by use of the beam splitter $BS_4$ and the mirrors $M_4$, $M_5$, $M_6$ and $M_7$. The two pump waves that are provided are arranged to pass through the non-linear medium of the phase conjugate mirrors along the same path but in opposite directions to provide the first and second beams discussed in the arrangement of FIG. 1. The laser beam that forms the standing wave pattern in the optical resonator forms the third beam of the arrangement used to form a beam that is the phase conjugate of the third beam.

With mirror modifications, an arrangements of this kind can be used to form a double-pass optical laser amplifier in accordance with the invention. Such an amplifier includes a laser medium that can provide gain to an optical wave passing therethrough in either direction. Advantageously, this may be a crystal of the kind also used for diode lasers but one in which no provision is made for providing reflective end walls. The input wave to be amplified is directed by way of suitable optics to travel through the gain medium first from left to right. A conjugate phase medium is positioned to intercept the amplified beam exiting the right end of the medium and to reflect it back for travel from right to left through the laser medium for further amplification. After such second amplification, the beam exits the laser medium and suitable optics directs it for utilization.

Figure 3:
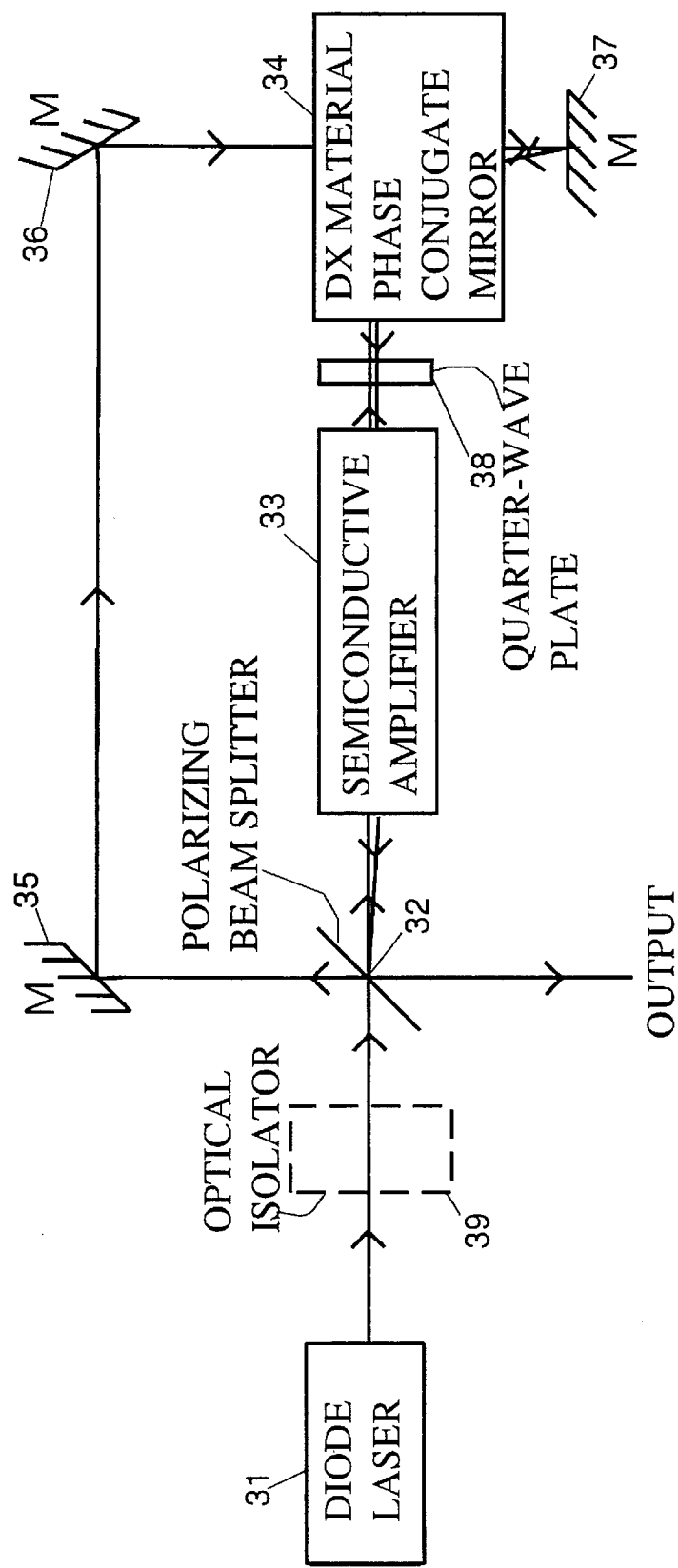
FIG. 3 shows a laser amplifier that uses a phase conjugate mirror as a reflector to provide a double pass amplifier in accordance with the invention.

FIG. 3 shows the basic components of a laser amplifier 30 of this kind. A diode laser 31 serves both as the source of the input beam to be amplified as well as the source of the beams to be used by the phase conjugate mirror for the non-linear mixing. The beam from source 31 is passed by way of a polarizing beam splitter 32 through the semiconductor element 33 which is designed and operated in known fashion to serve as the gain medium of a laser amplifier. Typically it will consist of the same material as is used in the diode laser but there will be absent any reflecting elements. The reflecting role will be served by the phase conjugate mirror 34 of DX-material positioned to intercept the beam passing through the element 33. Two pumping beams for the mixing are supplied by the beam split off by the beam splitter 33 after reflection from mirrors 35, 36 and 37.

Advantageously a quarter wave plate 38 is included between active element 33 and the phase conjugate mirror 34 so that it will result in a 90 degree rotation in the return beam for maximum deflection by the polarizing beam splitter 32 towards the output. It may also be advantageous to include an optical isolator 39 (shown in phantom) to minimize the reentry of any of the reflected beam into the diode laser 31, which might tend to instability in its operation.

It is to be understood that the specific embodiments described are merely illustrative of the general principles of the invention. Various other embodiments should be apparent to a worker in the art consistent with these principles.

What is claimed is:

1. A phase conjugate mirror comprising a compound semiconductive medium that is doped with donors for creating DX centers, and means for irradiating the medium with three separate waves for mixing therein and creating a fourth phase conjugate wave; and means for intercepting for utilization said fourth wave.

2. A phase conjugate mirror in accordance with claim 1 in which the three waves used for irradiating the medium are each of the same wavelength.

3. A phase conjugate mirror in accordance with claim 2 in which the medium is a homogeneous monocrystalline gallium arsenide doped with silicon atoms.

4. A laser comprising a laser medium, an optical resonator including first and second reflecting means positioned at opposite ends of the laser medium, the first reflecting means being a partially transmissive conventional mirror and the second reflecting means being a phase conjugate mirror comprising a compound semiconductive medium including DX-centers and means for collecting laser light exiting the optical cavity via the partially transmissive first mirror, forming said light into a pair of separate beams, and passing said separate beams through the compound semiconductive medium for non-linear mixing with the laser light in the cavity.

* * * * *